United States Patent [19]

Lannutti

[11] Patent Number: 4,746,287

[45] Date of Patent: May 24, 1988

[54] FIBER MATRIX BURNER COMPOSITION WITH ALUMINUM ALLOYS AND METHOD OF FORMULATION

[75] Inventor: John J. Lannutti, Palo Alto, Calif.

[73] Assignee: Gas Research Institute, Chicago, Ill.

[21] Appl. No.: 820,720

[22] Filed: Jan. 17, 1986

[51] Int. Cl.⁴ ............... F23D 14/14; C04B 38/06; B28B 1/16
[52] U.S. Cl. .................. 431/328; 264/44; 264/45.3; 264/46.4; 264/46.7; 264/46.9; 264/256; 501/95
[58] Field of Search .............. 264/44, 45.3, 46.4, 264/46.7, 46.9, 256; 431/328; 501/95

[56] References Cited

U.S. PATENT DOCUMENTS

| | | |
|---|---|---|
| 3,275,497 | 9/1966 | Weiss et al. |
| 3,383,159 | 5/1968 | Smith, Jr. .................. 431/7 |
| 3,697,447 | 10/1972 | Bettinardi .................. 431/328 X |
| 3,966,391 | 6/1976 | Hindin et al. .................. 431/7 |
| 4,021,185 | 5/1977 | Hindin et al. .................. 431/7 |
| 4,048,113 | 9/1977 | Risse .................. 252/462 |
| 4,311,447 | 1/1982 | Rackley et al. .................. 431/7 |
| 4,455,196 | 6/1984 | Craig .................. 431/328 X |
| 4,519,770 | 5/1985 | Kesselring et al. .................. 431/7 |

*Primary Examiner*—Philip Anderson
*Attorney, Agent, or Firm*—Flehr, Hohbach, Test, Albritton & Herbert

[57] ABSTRACT

A fiber matrix burner and method of manufacture in which a shaped burner element is formed by accreting a slurry onto a foraminous support. The slurry is comprised of ceramic fibers, a binding agent, a vaporizable filler, and a powdered, normally non-flammable aluminum alloy having a melting point between 660° C. and 1,000° C. After the drying and firing, a porous matrix of the fibers is formed which flamelessly combusts a fuel-air mixture. During combustion, the aluminum alloy inhibits growth of alumina crystals on the fiber surface to prolong burner life and, in addition, protects the burner both from extreme temperature and flashback.

8 Claims, 2 Drawing Sheets

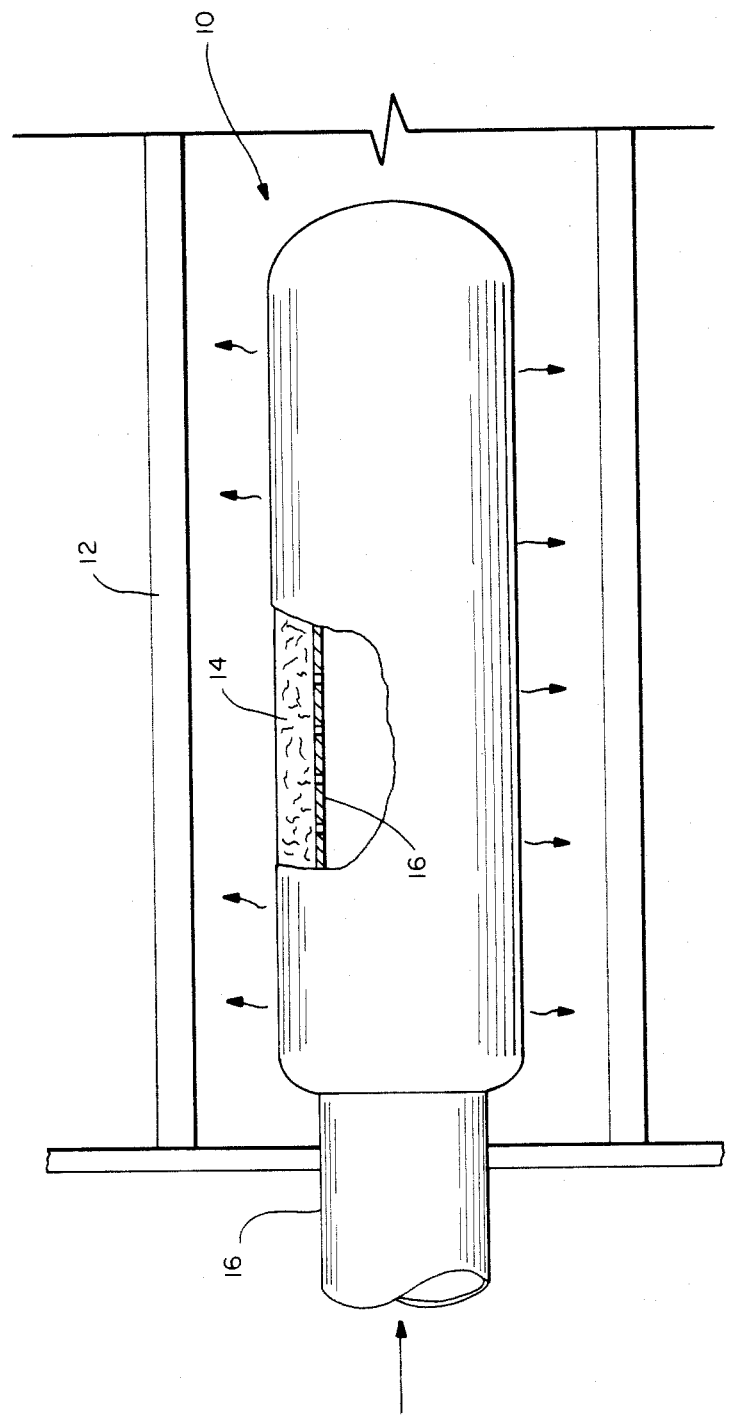

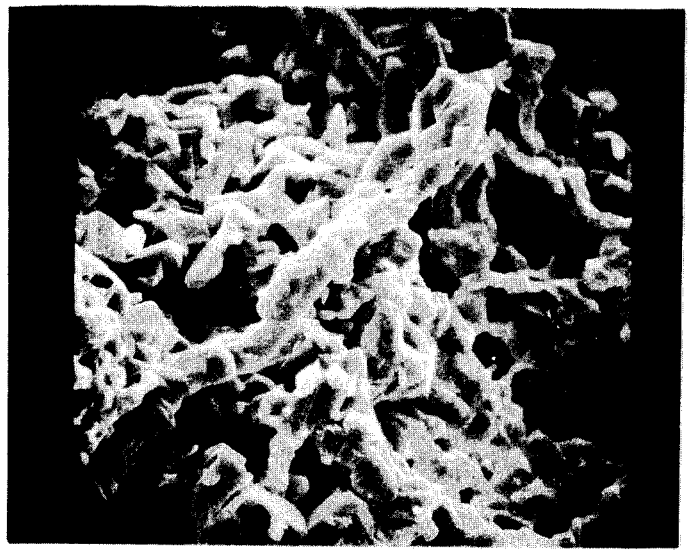
PRIOR ART
FIG.—2
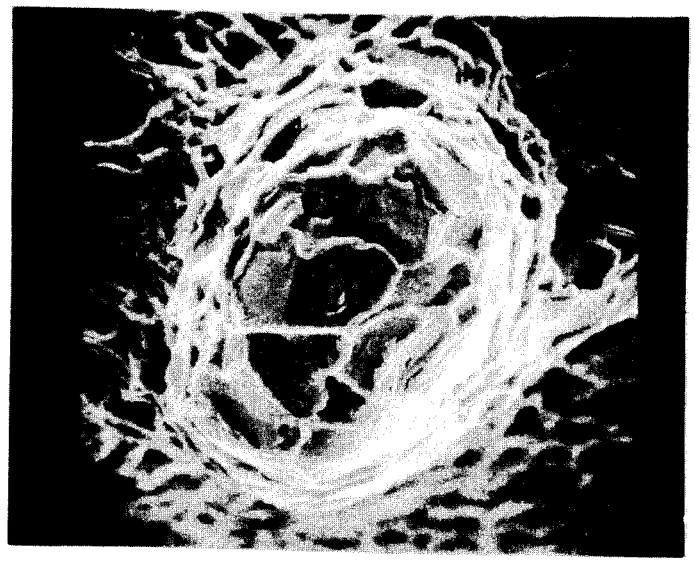
FIG.—3

FIBER MATRIX BURNER COMPOSITION WITH ALUMINUM ALLOYS AND METHOD OF FORMULATION

This invention relates in general to radiant burners of fiber matrix composition. The invention relates more particularly to radiant fiber matrix burners for use in applications such as fire tube boilers, process heaters, warm air furnaces, and commerical and residential water heaters.

The operating characteristics of conventional fiber matrix burners provide a number of important advantages in gas-fired heating applications. These burners produce radiant heat by flameless combustion at temperatures on the order of 1,000° C. The burners operate with relatively low $NO_x$ emissions, high thermal efficiency, no risk of flashback, they turn on and off instantaneously and operate with little aerodynamic combustion noise.

Fiber matrix burners of the type described are capable of being molded into various configurations depending upon the particular end-use application; for example, the burners can be molded into different cylindrical shapes or into flat plate configurations. The burners have been employed in a wide range of applications including fired heaters such as process heaters in the chemical industry, and for use in the combustion chambers of fire tube boilers, warm air furnaces, and commercial and residential water heaters. The fiber matrix burners have also been adapted for retrofit installation in existing heaters to replace the conventional supported-flame type burners.

The operation of conventional fiber matrix burners over a long period of time can result in "aging" of the fiber matrix structure, which reduces burner life. This "aging" is attributed to the deposit of undesirable crystals of alumina on the surfaces of the fibers such that a gradual build up of the alumina decreases burner activity over time.

It is therefore a general object of the present invention to provide a new and improved radiant fiber matrix burner which obviates the "aging" problem of conventional burners.

Another object is to provide a fiber matrix composition and method of manufacture which produces a burner that minimizes buildup of undesirable alumina on the fiber surfaces to maintain burner activity over a longer period of time.

The invention in summary comprises a fiber matrix burner and method of manufacture in which the burner element is accreted on a foraminous support from an aqueous slurry comprising ceramic fibers, a binding agent, a vaporizable filler, and a powdered normally non-flammable aluminum alloy. The burner structure is vacuum formed on a foraminous support of the desired shape. The composition is then heated to vaporize the filler leaving a porous burner structure.

The foregoing and additional objects and features of the invention will appear from the following specification in which the several embodiments have been set forth in connection with the accompanying drawings.

FIG. 1 is a cross-sectional view illustrating a fiber matrix burner element of the invention within a typical combustion chamber.

FIG. 2 is a microphotograph of a prior art fiber matrix structure from a conventional burner showing the undesirable growth of alumina crystals following burner operation over a period of time.

FIG. 3 is a microphotograph of the fiber structure of a burner incorporating the invention after burner operation over a period of time comparable to that described for FIG. 2.

In the drawings, FIG. 1 illustrates generally at 10 one embodiment of the invention providing a radiant fiber matrix burner of cylindrical shape for transferring heat primarily by radiation to a heat sink, shown as the typical firetube boiler combustion chamber 12. The invention is adapted for a wide range of end-use of applications, such as within the combustion chambers of fire tube boilers, process heaters, warm air furnaces, and commercial and residential water heaters. While the burner 10 shown for the embodiment of FIG. 1 is cylindrical, the invention can also be adapted for use in other shapes such as flat plate burners.

Burner 10 is comprised of a wall structure 14 formed of a matrix of ceramic fibers, and the wall is carried on a suitable foraminous support, such as the tubular metal screen 16. Interstitial spaces or pores are interconnected throughout the fiber matrix for the passage of gas. Premixed air and fuel, for example natural gas, is pumped under pressure through inlet 16 and disperses outwardly through the pores of the matrix. The mixture is ignited on the outer surface of the burner wall and flamelessly combusts at a temperature on the order of 1,000° C. along a shallow combustion zone.

The conventional method of manufacturing the above-described prior art burner wall structure includes the preparation of an aqueous slurry of inorganic fibers, binding agent, finely divided filler and powdered aluminum.

The inorganic fibers are of ceramic or refractory composition and can be comprised of substantial portions of both alumina and silica with fiber lengths on the order of one inch. Other fibers that can be employed include quartz fibers, alumina fibers, zirconia fibers, vitreous silica fibers and other generally available ceramic fibers such as the commercially available Kaowool fiber as well as the Fiberfrax ceramic fiber manufactured by the Carborundum Company.

The binding agent used in the conventional process typically comprises a mixture of aluminum nitrate and colloidal alumina in the aqueous slurry. The binding agent serves to hold the fibers together up to the use temperatures on the order of 1,100° C. Gels formed from aluminum nitrate and a colloidal aluminum, such as that sold under the name Baymal, are satisfactory for this purpose. The finely divided filler within the slurry can be of a suitable vaporizable material such as methyl methacrylate, camphor, or menthol. These fillers are non-reactive under the conditions of manufacture and are capable of vaporizing completely without leaving any residue at a temperature between 93° C. and about 593° C. The powdered aluminum is contained in the slurry in the proportion of about ¼ to 4 grams of powdered aluminum per gram of fiber.

The next step in the conventional method of manufacture includes accreting the slurry upon a foraminous surface, such as a metal screen, through the application of differential pressure, such as in a vacuum forming process. The suction force of the vaccuum draws liquid from the slurry through the screen, with the fibers and other solids being retained on the surface of the screen. The screen with its coating of solids is then withdrawn from the slurry and dried at a temperature in the range of 27° C. to 66° C. for sufficient time, on the order of one hour or more, to drive off the remaining moisture. The structure is then heated slowly from room temperature to a firing temperature between 150° C. and 600° C., and preferably approximately 280° C., for a time on the order of three hours. At this firing temperature the filler material vaporizes, leaving a matrix of uniform, interconnected pores throughout the matrix of fibers. The burner structure can then be mounted in the combustion chamber or other end-use application for operation. After initial burner operation the surfaces of the refractory fibers have a thin coating of aluminum oxide and powdered aluminum on the refractory fibers. The aluminum oxide of the coating is formed from the chemical decomposition of the aluminum nitrate, as well as from the colloidal alumina.

It is known that in the conventional burners made by the process described the powdered aluminum functions to decrease surface temperature and thereby increase the resistance to thermal flashback, permitting a reasonable range of variation in fuel-air ratio and flow velocity. During operation of these conventional burners it has been found that a part of the aluminum from the powder vaporizes and forms a layer of gaseous aluminum over the surface of the fibers. This gaseous aluminum tends to deposit on the fiber surfaces and nucleates as alumina crystals. FIG. 2 is a microphotograph enlarged 1,000X showing the growth of alumina crystals on the ceramic fiber of a prior art burner following 1000 hours of operation. The growth of alumina crystals eventually covers the surface of the fibers and influences the mechanical properties at the surface. The alumina becomes very brittle such that the surface becomes harder and the matrix less porous. The crystal growth also tends to cover up the surface so that the fuel-air pressure drop rises. All of these factors constitute aging of the burner, which is reflected in decreased burner activity.

The present invention forms the fiber matrix burner from a slurry composition which includes the inorganic fibers, binding agent and finely divided filler as in the above-described conventional composition but in which powdered aluminum alloy is employed in place of the powdered aluminum. The aluminum alloy used in the composition of the invention is a metal having a melting point between 660° C. and 1,000° C. Alloys with melting points below that range are undesirable because too much aluminum vapor is formed, and alloys with melting points above that range would not melt, which is desirable for proper operation.

Metals suitable for alloying with aluminum for use in the invention include metals selected from the group consisting of copper, zirconium, iron, chromium, silicon, magnesium, zinc and titanium. Preferably the amount of alloying metal is more than 1% by weight of the resulting aluminum alloy.

The aluminum alloy is powdered to an average particle size in the range of 40 to 700 microns, and preferably 125 microns. The amount of powdered alloy employed in a batch process of making the slurry preferably is in the range of 5 to 80 gm alloy per gallon of binding agent gel, with the range of 30 to 60 gm alloy per gallon of gel producing satisfactory results.

The following are examples of powdered alloys suitable for use in the invention:

Example I: Al alloyed with Si (36% by weight)
Example II: Al alloyed with Fe (25% by weight)
Example III: Al alloyed with Cr (10% by weight)

The invention also encompasses powdered aluminum alloyed with two or more metals selected from the group described above, as follows:

Example IV

Al alloyed with Cu (4.6% by weight)+Mg (1.7% by weight)+Zr (0.5% by weight)+trace amounts of Mn, Si, Cr, Fe, Zn, Ti, others (0.1% by weight combined).

This alloy is sold commercially as Aluminum Metallic Powder −40/+200 by Valimet, Inc.

Depending on the requirements of a particular end-use application, a suitable catalyst agent, such as metallic Cr, can be interspersed through the matrix as by thin strands of Cr.

An example of manufacturing a fiber matrix burner in accordance with the invention is as follows. The binding agent is mixed in the proportion of 124.9 grams of colloidal alumina and 186.7 grams of a 60% aqueous solution of aluminum nitrate-9 hydrate per gallon of water to form a gel through agitation. The ceramic fiber comprising Kaowool pre-chopped fiber is added in the amount of 18 grams fiber per gallon of gel, with the mixture then agitated. The filler comprising 20–80 mesh methyl methacrylate is added in the amount of 144.8 grams per gallon of gel, which is then further agitated for sufficient time, such as three hours or more, to eliminate entrapped air. Aluminum alloy comprising the Aluminum Metallic Powder −40/+200 is powdered to an average particle diameter of around 100 microns and is added to the gel in the proportion of 40 grams alloy per gallon of gel. The slurry is then thoroughly agitated.

A foraminous support of the desired shape, such as a cylindrical tube of metal screen, is then immersed in the slurry and connected to a source of vacuum. The vacuum draws the liquids through the openings of the screen to cause accretion of the fibers and other solids onto the outer surface of the screen. This vacuum-forming step continues until the desired burner thickness is achieved, such as within the range of 0.318 cm to 0.953 cm. The resulting burner element is then withdrawn from the slurry and dried by heating at a temperature on the order of 71° C. for three hours. The element is then slowly heated to a firing temperature of between 93° C. and 593° C. for a sufficient time, on the order of three hours, to vaporize all of the filler. The burner element can then be mounted in a combustion chamber for connection with a source of pre-mixed fuel and air.

During operation of the fiber matrix burner of the invention, the powdered aluminum alloy not only functions to increase resistance to flashback, but markedly extends the burner life in comparison to conventional fiber matrix burners. The aluminum alloy wets the fibers and the wetting increases the aluminum surface area. Surface temperature is decreased and this protects the fibers from extreme temperature, which would degrade fiber life. The high melting point of the aluminum alloy decreases the amount of aluminum vapor generated at the operating temperatures, and thereby decreases the amount of alumina buildup on the surface. An equilibrium is achieved between the aluminum vapor in the atmosphere and the aluminum on the fiber surfaces. By decreasing the amount of aluminum vapor concentration in the atmosphere, the present invention decreases the buildup of alumina over time. The microphotograph of FIG. 3 illustrates at 884X magnification the surfaces of ceramic fibers of a burner incorporating the invention after 1,000 hours of burner operation.

While the foregoing embodiments are at present considered to be preferred, it is understood that numerous variations and modifications may be made therein by those skilled in the art, and it is intended to cover in the appended claims all such variations and modifications as follows in the true spirit and scope of the invention.

What is claimed is:

1. A fiber matrix burner made by the process of preparing an aqueous slurry comprising inorganic fibers, an inorganic binding agent gel, a non-reactive vaporizable filler and a powdered, normally non-flammable aluminum alloy with a melting point between 660° C. and 1000° C., said alloy being incorporated into the slurry in the proportion of ¼ to 4 grams per gram of said fibers, withdrawing moisture from the slurry while accreting the fibers on the surface of a foraminous support to form a burner structure, heating the structure to remove residual moisture, and heating the structure at a temperature sufficient to vaporize the filler to produce a matrix of interconnected pores throughout the structure with the fibers having a coating which includes the aluminum alloy.

2. A burner made by the process of claim 1 in which the aluminum alloy contains more than 1% of a metal selected from the group consisting of copper, zirconium, iron, chromium, silicon, magnesium, zinc and titanium.

3. A burner made by the process of claim 1 in which the powdered aluminum alloy is present in the slurry in the amount of 5 to 80 grams of alloy per gallon of the binding agent gel.

4. In a method of manufacturing a fiber matrix burner adapted for use in a combustion apparatus by accreting a shaped fibrous element on a foraminous support from a slurry composition comprising a plurality of ceramic fibers, an inorganic binding agent and a vaporizable filler in which heat is applied to vaporize the filler and to form pores in the element, the improvement comprising incorporating a powdered normally non-flammable aluminum alloy with a melting point between 660° C. and 1000° C. into the slurry composition prior to the step of accreting the element on the support, said alloy being incorporated into the slurry in the proportion of from ¼ to 4 grams per gram of said fibers.

5. A method as in claim 4 in which the aluminum alloy contains more than 1% of a metal selected from the group consisting of copper, zirconium, iron, chromium, silicon, magnesium, zinc and titanium.

6. A method of molding a combustion element comprising the steps of forming a slurry composition containing a powdered normally non-flammable aluminum alloy, ceramic fibers, an inorganic binding agent gel, and a non-reactive vaporizable filler interspersed throughout the slurry, said alloy being incorporated into the slurry in the proportion of from ¼ to 4 grams per gram of said fibers, and vaporizing the filler leaving a matrix of interconnected pores extending through the element.

7. A method as in claim 6 in which the powdered aluminum alloy is present in the slurry in the amount of 5 to 80 grams of alloy per gallon of the binding agent gel.

8. A method as in claim 6 in which the aluminum alloy contains more than 1% of a metal selected from the group consisting of copper, zirconium, iron, chromium, silicon, magnesium, zinc and titanium.

* * * * *